UNITED STATES PATENT OFFICE.

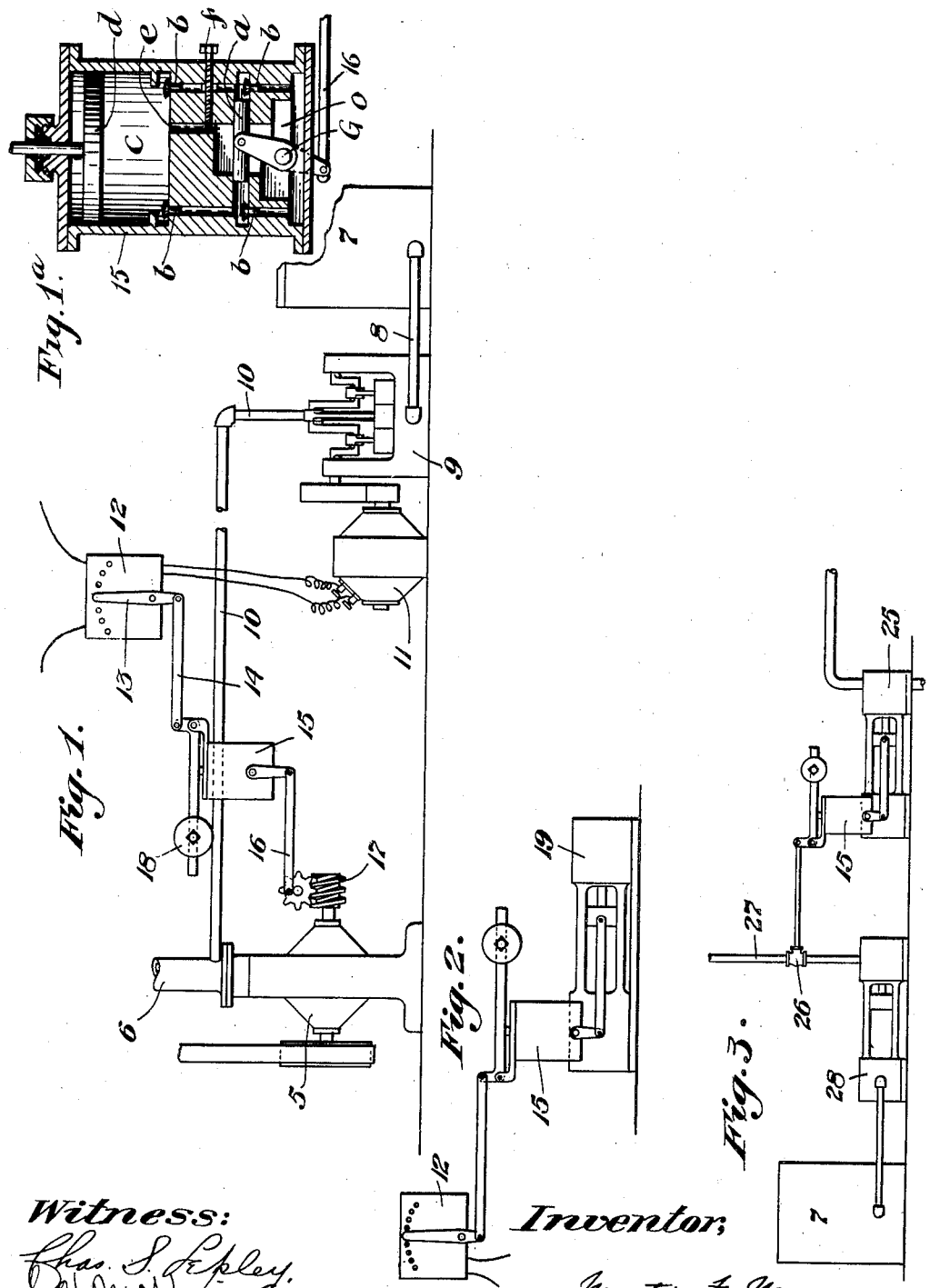

MARTIN F. NEWMAN, OF PITTSBURG, PENNSYLVANIA, ASSIGNOR TO WM. B. SCAIFE & SONS COMPANY, OF PITTSBURG, PENNSYLVANIA, A CORPORATION OF NEW JERSEY.

FLUID-FEED-REGULATING APPARATUS.

963,382. Specification of Letters Patent. Patented July 5, 1910.

Application filed May 2, 1907. Serial No. 371,415.

*To all whom it may concern:*

Be it known that I, MARTIN F. NEWMAN, a citizen of the United States, residing at Pittsburg, in the State of Pennsylvania, have invented certain new and useful Improvements in Fluid-Feed-Regulating Apparatus, of which the following is a specification.

My invention relates particularly to means for feeding a regulable quantity of fluid, proportionally to some other measured flow of fluid, as in feeding a chemical re-agent to the raw water in water purifying apparatus.

The principal objects of the invention are to provide means for regulating the feed of the chemical directly by the means governing the flow of raw water, and to do this whatever the relation or distance of the pumps, etc., to each other; to provide apparatus operated at any distance from and yet governed by, the water pump, for feeding a definite and regulated amount of chemical solution to the water being treated at any point desired.

In the accompanying drawing I have illustrated several forms of apparatus as adapted to water purifying plants, and in the drawings Figure 1 is a diagrammatic elevation showing a rotary pump for the water and electrical connections to the solution pump. Fig. 1ª is a section of the Mason regulator 15 in Fig. 1. Fig. 2 illustrates a mode of connecting with a reciprocating pump. Fig. 3 illustrates another direct connection where both pumps are reciprocating.

In such arts as water purifying there is usually a pump installed in the plant whose duty it is to feed the raw water to the treatment and settling vessels and at some convenient point a chemical solution is fed to the raw water; it is necessary to feed this solution in definitely known quantities which may be regulated to change the proportions according to the conditions of the water being treated. Frequently the supply pump is already installed, and it is desirable to devise a regulating device attachable to any pump whatever and at a distance if more convenient.

In Fig. 1, I have shown a rotary pump 5 which supplies the raw water through the pipe 6. At any convenient place there is a chemical solution tank 7, which by means of pipes 8 and 10 and a pump 9 supplies a chemical re-agent to the raw water at the desired point in the apparatus. The pump 9 may be conveniently driven by an electric motor 11 and this is regulated by means of a rheostat 12 whose movable arm 13 may be connected by a link 14 to a regulator 15. This regulator may be of any desired form, such as a common Mason liquid escapement pump as shown in detail in Fig. 1ª, operated by link 16 as by worm gear 17 on the shaft of the supply pump 5. (This regulator operats by oil escapement, the piston $a$ pumping oil from the lower chamber $o$ through passages and check valves $b, b, b, b$, into the chamber $c$ under the piston $d$, which piston will be moved upward when the oil is pumped in faster than it can escape from chamber $c$, through the small port $e$, controlled by screw needle $f$, to return to chamber $o$. The pumping piston $a$ is of course worked by a link on shaft G operated by the link 16 in Fig. 1.) By this means whatever amount of water is being supplied by the main pump 5, and whatever its rate of flow, the motor 11 is governed directly in proportion to it and the feed of the solution will be in exact proportion for the proper chemical reaction. Moreover, this proportion may be changed by adjusting the regulator 15 in any well known way as by adjusting its weight 18. It will be noted that by the electric connections of motor 11 the solution pump may be at any distance from the main supply pump and at any place that is convenient.

In Fig. 2 I have illustrated a reciprocating pump 19 which is connected directly by its cross-head to the regulator 15, the rest of the apparatus being as before.

In Fig. 4 is shown a reciprocating supply pump 25 whose cross-head is connected directly to the regulator 15 by a link and governs the valve 26 in the steam pipe 27 to the solution pump 28.

I have thus illustrated the use of my invention in connection with any type of pump for either the solution or the water supply, and it will be seen that in all of them the supply pump is connected up with the regulator which governs the solution feed directly and positively by means of the speed of the supply pump, which insures the water supply and the chemical solution being always in proper proportion, at whatever speed the supply is fed, and makes it easy to regulate this proportion at the same time it allows placing the two pumps in any relative position desired. Other advantages will readily occur to those familiar with the art.

Having thus described my invention and illustrated its use, what I claim as new and desire to secure by Letters Patent is the following:

1. In water purifying appratus, the combination with a water supply and a pump therefor, of a re-agent supply, a pump therefor operated independently of the water supply pump, and a power regulating mechanism directly operated by the water supply pump and in turn controlling the power operating the chemical supply pump, substantially as described.

2. In water purifying apparatus, the combination with a water supply and pump therefor, of a re-agent supply, an independently operated pump therefor, a fluid operated regulator and coöperating means for controlling the power of the re-agent pump, said regulator being directly connected to the water pump and intermittently controlling the speed of the re-agent pump, whereby the latter may be placed at any distance from the water supply pump, substantially as described.

3. The combination of a water supply pump, a solution pump, an electric motor for running the solution pump, and a rheostat governing the motor and itself governed by the speed of the water supply pump.

4. The combination with a rotary water supply pump, of a rheostat, a regulator geared to the pump shaft and operating the moving arm of the rheostat, a solution pump, and an electric motor to operate it, said rheostat thus governing the speed of the motor, substantially as described.

In testimony whereof I have hereunder signed my name, in the presence of the two subscribed witnesses.

MARTIN F. NEWMAN.

Witnesses:
F. W. H. CLAY,
CHAS. S. LEPLEY.